United States Patent
Zhang

(10) Patent No.: US 12,170,950 B2
(45) Date of Patent: Dec. 17, 2024

(54) METHOD AND DEVICE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 409 days.

(21) Appl. No.: 17/740,379

(22) Filed: May 10, 2022

(65) Prior Publication Data

US 2022/0272615 A1 Aug. 25, 2022

Related U.S. Application Data

(63) Continuation of application No. PCT/CN2021/076163, filed on Feb. 9, 2021.

(30) Foreign Application Priority Data

Feb. 18, 2020 (CN) .......................... 202010100354.9

(51) Int. Cl.
*H04W 48/12* (2009.01)
*H04W 84/04* (2009.01)

(52) U.S. Cl.
CPC .......... *H04W 48/12* (2013.01); *H04W 84/042* (2013.01)

(58) Field of Classification Search
CPC ............................ H04W 48/12; H04W 84/042
See application file for complete search history.

(56) References Cited

U.S. PATENT DOCUMENTS

2013/0079042 A1   3/2013 Hapsari et al.
2013/0273887 A1*  10/2013 Hole .................... H04W 48/02
                                                    455/411

(Continued)

FOREIGN PATENT DOCUMENTS

CN   101953194 A   1/2011
WO   2020013749 A1 1/2020

OTHER PUBLICATIONS

CN 1st Office Action received in application No. 202010100354.9 dated Jan. 6, 2022.

(Continued)

*Primary Examiner* — Kevin Kim

(57) ABSTRACT

The disclosure provides a method and a device for wireless communication. The method includes: determining a target identifier, and receiving a first signal, the first signal carrying first information; wherein the first information comprises information of an access stratum, the first information is used for indicating a first identifier set, and the first identifier set comprises a positive integer number of identifiers; the first identifier set is associated to second information; a second signal carries the second information, and the second information comprises information of a non-access stratum; whether the first identifier set comprises the target identifier is used for determining whether the second information is valid. The disclosure determines the validity of the second information through reasonably determining the target identifier and the first identifier set, thus increasing the reliability of the system and saving system resources.

20 Claims, 4 Drawing Sheets

(56) References Cited

U.S. PATENT DOCUMENTS

2016/0295483 A1* 10/2016 Jung .................. H04W 36/22
2018/0096587 A1    4/2018 Erman et al.

OTHER PUBLICATIONS

CN 1st Search Report received in application No. 202010100354.9 dated Dec. 29, 2021.
International search report in patent application PCT/CN2021/076163 dated May 18, 2021.
Ericsson: "ETWS and CMAS in connected mode for LTE-M", 3GPP Draft; R2-1900739—ETWS and CMAS in Connected Mode for LTE-M 3rd Generation Partnership Project(3GPP).

* cited by examiner

METHOD AND DEVICE FOR WIRELESS COMMUNICATION

CROSS REFERENCE TO RELATED APPLICATIONS

This application is a continuation of International Application No. PCT/CN2021/076163, filed Feb. 9, 2021, claims the priority benefit of Chinese Patent Application No. 202010100354.9, filed on Feb. 18, 2020, the full disclosure of which is incorporated herein by reference.

BACKGROUND

Technical Field

The disclosure relates to transmission methods and devices in wireless communication systems, and in particular to a transmission method and device in wireless communication to improve resource utilization efficiency, improve system flexibility and accurately provide service coverages.

RELATED ART

Application scenarios of future wireless communication systems are becoming increasingly diversified, and different application scenarios have different performance requirements on systems. In order to meet different performance requirements of various application scenarios, the 3rd Generation Partner Project (3GPP) Radio Access Network (RAN) #72 plenary session decided to conduct the study of New Radio (NR) (or 5G). The work item of NR was approved at the 3GPP RAN #75 session to standardize the NR.

In a communication process, both Long Term Evolution (LTE) and 5G NR will involve reliable and accurate reception of information, determination of information validity, flexible allocation of resources, extendable system structure and efficient distribution of non-access layer information, which are of great significance for the normal communication between base stations and UEs, for the reasonable scheduling of resources and for the balancing of system load. It is fair to say that enhanced Mobile BroadBand (eMBB), Ultra Reliable Low Latency Communication (URLLC) and enhanced Machine Type Communication (eMTC) are all indispensable foundations to improve throughput, to meet communication requirements of various services, to improve spectrum utilization and to improve service quality. Meanwhile, they are widely used in Industrial Internet of Things (IIoT), in Vehicular to X (V2X), in Device to Device, in unlicensed spectrum communication, in user communication quality monitoring, in network planning and optimization, in Non Territorial Network (NTN), in Territorial Network (TN), in any combinations of the above, in radio resource management, in multi-antenna codebook selection and in beamforming. The transmission mode of information includes broadcast and unicast, both of which are indispensable for 5G systems.

With the increasing scenarios and complexity of systems, higher requirements are put forward for latency reduction, reliability enhancement, system stability enhancement, service flexibility and power saving; meanwhile, compatibility need to be taken into account between different systems and different versions when designing the systems.

SUMMARY

In various communication scenarios, a system needs to transmit messages to a user through broadcast and unicast; for a single user, unicast is generally employed; for multiple or an indefinite number of users, broadcast may be employed; however, the broadcast transmission generally leads to the following problem: the users who receive the messages are not determinate and unrelated users might receive the messages, which is not expected by the system; meanwhile, the deployment of service has its own requirements, the service does not expect unrelated users to receive the messages, because the reception of these messages may cause waste of resources, may cause consumption of power and may cause unnecessary disorders. Therefore, a method is required that can help the user determine whether the received broadcast messages are valid, whether the messages need to be received or processed. The above problem is particularly prominent for large cells; if a cell has a large coverage, for example, an NTN cell, the number of users who receive the messages are bound to be great; therefore, it is urgent to provide a method which can help these users determine whether the received or to-be-received messages are valid messages. All of the above bring some problems to the design of the system. Moreover, cells might be different in size and the deployments of services are not the same too, both of which increase the difficulty in the scheme design.

In view of the above problems, the disclosure provides a solution.

It should be noted that embodiments of any node in the disclosure and characteristics in the embodiments may be applied to any other node if no conflict is incurred. The embodiments in the disclosure and characteristics in the embodiments may be mutually combined arbitrarily if no conflict is incurred. In addition, it should be noted that in the above problem description the IoT scenario is merely an example of one application scenario for the solution provided by the disclosure; the disclosure is also applicable to scenarios of, for example, non-territorial networks, and can achieve similar technical effects as in IoT scenarios. Similarly, the disclosure is also applicable to scenarios of networks having, for example, Unmanned Aerial Vehicle (UVA) or vehicle networks, and can achieve similar technical effects as in IoT scenarios. Furthermore, the adoption of a unified solution by different scenarios (including, but not limited to, NTN scenarios and TN scenarios) helps reduce the complexity and cost of hardware.

The disclosure provides a method in a first node for wireless communication, wherein the method includes:
  determining a target identifier; and
  receiving a first signal, the first signal carrying first information.

Herein, the first information includes information of an access stratum, the first information is used for indicating a first identifier set, and the first identifier set includes a positive integer number of identifiers; the first identifier set is associated to second information; a second signal carries the second information, and the second information includes information of a non-access stratum; whether the first identifier set includes the target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the problem to the solved by the disclosure includes: when a signal is transmitted through broadcast, if a transmission area for the signal is larger than an area to deploy the transmitted information, those users within the coverage but beyond the area to deploy the information should not receive or process the information or should process the information in a different manner; otherwise, unnecessary disorders will be caused, also unnecessary consumption of user power might be caused, meanwhile, these users might drop the reception of other services and receive this information in a particular time-frequency resource, which will affect the reception of other services. In addition, since a non-access stratum may not necessarily be able to accurately know the coverage of radio signals during service deployment, an access stratum is needed to help a receiving node determine whether the information is valid according to the coverage and the information of the service deployment, when this kind of information coming from a non-access stratum is transmitted. Through the above method, a first identifier set is associated to second information; in addition, the node needs to determine a target identifier, and determines a validity through the relationship between the target identifier and the first identifier set, thereby solving the above problem.

In one embodiment, the above method is characterized in that: the first signal includes a radio signal.

In one embodiment, the above method is characterized in that: the second signal includes a radio signal.

In one embodiment, the above method is characterized in that: the first signal is transmitted on a Physical Downlink Control Channel (PDCCH).

In one embodiment, the above method is characterized in that: the first signal is transmitted on a Physical Downlink Shared Channel (PDSCH).

In one embodiment, the above method is characterized in that: the first signal is transmitted on a Physical Downlink Broadcast Channel (PBCH).

In one embodiment, the above method is characterized in that: the first signal is transmitted on a Physical SideLink Broadcast Channel (PSBCH).

In one embodiment, the above method is characterized in that: the first signal is transmitted on an NTN related channel.

In one embodiment, the above method is characterized in that: a Radio Resource Control (RRC) message carried by the first signal is transmitted through a Broadcast Control Channel (BCCH).

In one embodiment, the above method is characterized in that: an RRC message carried by the first signal is not encrypted and has no integrity protection.

In one embodiment, the above method is characterized in that: Downlink Control Information (DCI) carried by the first signal is transmitted through a PDCCH, and a search space which is used for detecting the PDCCH belongs to a Common Search Space (CSS).

In one embodiment, the above method is characterized in that: the second signal is transmitted on a Physical Downlink Shared Channel (PDSCH).

In one embodiment, the above method is characterized in that: the second signal is transmitted on an NTN related channel.

In one embodiment, the above method is characterized in that: an RRC message carried by the second signal is transmitted through a BCCH.

In one embodiment, the above method is characterized in that: an RRC message carried by the second signal is not encrypted and has no integrity protection.

In one embodiment, the above method is characterized in that: the first information includes Downlink Control Information (DCI).

In one embodiment, the above method is characterized in that: the first information includes a DCI scrambled with a Radio Network Temporary Identifier (P_RNTI).

In one embodiment, the above method is characterized in that: the first information includes a DCI Format 1_0.

In one embodiment, the above method is characterized in that: the first information includes Sidelink Control Information (SCI).

In one embodiment, the above method is characterized in that: the first information includes a short message.

In one embodiment, the above method is characterized in that: the first information includes a System Information Block (SIB).

In one embodiment, the above method is characterized in that: the first information includes a System Information Block 1 (SIB1).

In one embodiment, the above method is characterized in that: the second information includes an SIB.

In one embodiment, the above method is characterized in that: the second information includes a System Information Block 6 (SIB6).

In one embodiment, the above method is characterized in that: the second information includes a System Information Block 7 (SIB7).

In one embodiment, the above method is characterized in that: the second information includes Public Warning System (PWS) information.

In one embodiment, the above method is characterized in that: the second information includes Earthquake and Tsunami Warning System (ETWS) information.

In one embodiment, the above method is characterized in that: the second information includes a message coming from an Access and Mobility Management Function (AMF).

In one embodiment, the above method is characterized in that: the second information includes a message coming from an Evolved Packet System (EPS).

In one embodiment, the above method is characterized in that: the second information includes a message coming from a Non-Access Stratum (NAS).

In one embodiment, the above method is characterized in that: an RRC message included in the second information is transmitted through a BCCH.

In one embodiment, the above method is characterized in that: the first information includes a message coming from an Access Stratum (AS).

In one embodiment, the above method is characterized in that: the first information includes an RRC message.

In one embodiment, the above method is characterized in that: the phrase that whether the first identifier set includes the target identifier is used for determining whether the second information is valid includes: whether the first identifier set includes the target identifier is used for determining whether the second information is valid.

In one embodiment, the above method is characterized in that: the first node determines whether the second information is valid through a validation process.

In one embodiment, the above method is characterized in that: any one identifier included in the first identifier set may be used for mobility management.

In one embodiment, the above method is characterized in that: the mobility management includes a measurement.

In one embodiment, the above method is characterized in that: the mobility management includes a cell selection.

In one embodiment, the above method is characterized in that: the mobility management includes a cell reselection.

In one embodiment, the above method is characterized in that: the mobility management includes paging.

In one embodiment, the above method is characterized in that: the mobility management includes a beam sweeping.

In one embodiment, the above method is characterized in that: the mobility management includes a beam selection.

In one embodiment, the above method is characterized in that: the mobility management includes a handover.

In one embodiment, the above method is characterized in that: the mobility management includes a PLMN selection.

In one embodiment, the above method is characterized in that: the mobility management includes a registration.

In one embodiment, the above method is characterized in that: the mobility management includes a Tracking Area Update (TAU).

In one embodiment, the above method is characterized in that: the first identifier set is related to an AS.

In one embodiment, the above method has the following benefit: the first node may determine whether the second information is valid though the above method.

In one embodiment, the above method has the following benefit: false alarms are reduced.

In one embodiment, the above method has the following benefit: power is saved.

In one embodiment, the above method has the following benefit: a core network can be well separated from a radio access network, the core network does not need to clearly know all radio transmission details of the radio access network when deploying services, which is particularly useful when one core network is connected to multiple radio access networks to implement network share.

In one embodiment, the above method has the following benefit: it is convenient to coordinate with the service deployment method commonly used by the core network, and the complexity of the core network is reduced.

In one embodiment, the above method has the following benefit: users who have no locating capability or cannot be located can be supported.

In one embodiment, the above method has the following benefit: a small impact is caused to other services.

In one embodiment, the above method has the following benefit: the method can be combined with the coverage of beam in a cell, convenience and flexibility are achieved, and the complexity of management of the base station is reduced.

Specifically, according to one aspect of the disclosure, when the second information is determined to be valid, the second receiver receives the second signal, the non-access stratum information carried by the second information is forwarded to the non-access stratum, and the first node indicates to a user a content of a warning message included in the non-access stratum information carried by the second information;

when the second information is determined to be invalid, the first node neglects the second information.

In one embodiment, the above method is characterized in that: the NAS information carried by the second information includes a warning message.

In one embodiment, the above method is characterized in that: when the second information is determined to be valid, the first node indicates to a user a content of the warning message.

In one embodiment, the user includes an individual using the first node.

In one embodiment, the above method is characterized in that: the second information includes a messageIdentifier and a serialNumber; the process of the second receiver receiving the second signal incudes the processing of the messageIdentifier and serialNumber carried by the second message.

In one embodiment, the above method is characterized in that: the second information includes multiple segments; the process of the second receiver receiving the second signal incudes the processing of the multiple segments of the second information.

In one embodiment, the above method is characterized in that: when the second information is determined to be invalid, the first node does not receive the second signal.

In one embodiment, the above method is characterized in that: when the second information is determined to be invalid, the first node does not detect a PDCCH scrambled with a P-RNTI in a search space of the PDCCH indicating the second signal.

In one embodiment, the above method is characterized in that: when the second information is determined to be invalid, the first node does not detect a PDCCH scrambled with an SI-RNTI in a search space of the PDCCH indicating the second signal.

In one embodiment, the above method is characterized in that: when the second information is determined to be invalid, the first node receives the second signal but does not process the second information.

In one embodiment, the above method is characterized in that: when the second information is determined to be invalid, the first node receives the second signal but does not forward the non-access stratum information included in the second information to the non-access stratum.

Specifically, according to one aspect of the disclosure, when the second information is determined to be valid, the second receiver receives the second signal, the non-access stratum information carried by the second information is forwarded to the non-access stratum, and the first node indicates to a user a content of a warning message included in the non-access stratum information carried by the second information;

when the second information is determined to be invalid, the second receiver receives the second signal, the non-access stratum information carried by the second information is forwarded to the non-access stratum, and the first node does not indicate to a user a content of a warning message included in the non-access stratum information carried by the second information.

In one embodiment, the above method is characterized in that: when the second information is determined to be invalid, the first node does not indicate to a user a content of the warning message.

Specifically, according to one aspect of the disclosure, when the second information is determined to be valid, the second receiver receives the second signal, the non-access stratum information carried by the second information is forwarded to the non-access stratum, and the first node indicates to a user a content of a warning message included in the non-access stratum information carried by the second information;

when the second information is determined to be invalid, the second receiver receives the second signal, the non-access stratum information carried by the second information is forwarded to the non-access stratum, the first node does not indicate to a user a content of a warning message included in the non-access stratum information carried by the second information, and the first node stores the warning message included in the non-access stratum information carried by the second information.

In one embodiment, the above method is characterized in that: when the second information is determined to be valid, the second receiver receives the second signal, the non-access stratum information carried by the second information is forwarded to the non-access stratum, the first node does not indicate to a user a content of a warning message included in the non-access stratum information carried by the second information, and the first node stores into a warning message list the warning message included in the non-access stratum information carried by the second information.

In one embodiment, the above method is characterized in that: the stored warning message included in the non-access stratum information carried by the second information is automatically deleted after time T, wherein the time T includes 24 hours.

In one embodiment, the above method is characterized in that: when the second information is redetermined to be valid, the stored warning message included in the non-access stratum information carried by the second information is indicated to a user.

Specifically, according to one aspect of the disclosure, when the second information is determined to be valid, the second receiver receives the second signal, the non-access stratum information carried by the second information is forwarded to the non-access stratum, and the first node indicates to a user a content of a warning message included in the non-access stratum information carried by the second information;

when the second information is determined to be invalid, the second receiver receives the second signal, the non-access stratum information carried by the second information is forwarded to the non-access stratum, and invalid information of the second information is forwarded to the non-access stratum.

In one embodiment, the above method is characterized in that: the invalid information of the second information includes an Invalid indication.

In one embodiment, the above method is characterized in that: the invalid information of the second information includes an Invalid Indicator.

In one embodiment, the above method is characterized in that: the invalid information of the second information includes a valid indication.

In one embodiment, the above method is characterized in that: the invalid information of the second information includes an Out of Coverage indication.

In one embodiment, the above method is characterized in that: the invalid information of the second information includes an Out of Area indication.

Specifically, according to one aspect of the disclosure, the first signal and the second signal occupy different time-frequency resources.

In one embodiment, time-frequency resources carrying the first signal are orthogonal to time-frequency resources carrying the second signal.

In one embodiment, at least one Resource Element (RE) in the time-frequency resources carrying the first signal does not belong to the time-frequency resources carrying the second signal.

In one embodiment, time-frequency resources carrying the first signal and time-frequency resources carrying the second signal are Time Domain Multiplexing (TDM).

In one embodiment, time-frequency resources carrying the first signal and time-frequency resources carrying the second signal are Frequency Domain Multiplexing (FDM).

Specifically, according to one aspect of the disclosure, the first signal carries first area configuration information, the first area configuration information includes geometrical information of an area, and the first area configuration information is used for determining the target identifier.

In one embodiment, the above method is characterized in that: the area configuration information includes a ZoneConfig Information Element (IE).

In one embodiment, the above method is characterized in that: the area configuration information includes an NtnZoneConfig IE.

In one embodiment, the above method is characterized in that: the area configuration information includes an Ntn-ZoneConfig IE.

Specifically, according to one aspect of the disclosure, the method includes:

the first receiver receives a target signal, wherein the target signal is used for determining a first measurement result, and the first measurement result is used for determining the target identifier.

In one embodiment, the above method is characterized in that: the target signal includes a Synchronization Signal Block (SSB).

In one embodiment, the above method is characterized in that: the target signal includes a synchronization signal.

In one embodiment, the above method is characterized in that: the target signal includes a radio signal used for locating.

In one embodiment, the above method is characterized in that: the target signal includes a Global Positioning System (GPS) signal.

In one embodiment, the above method is characterized in that: the target signal includes a Global Navigation Satellite System (GNSS) signal.

In one embodiment, the above method is characterized in that: the target signal includes a Beidou satellite signal.

In one embodiment, the above method is characterized in that: the target signal includes a TN cell signal.

In one embodiment, the above method is characterized in that: the target signal includes a signal transmitted by a node beyond the cell in which the first node resides.

In one embodiment, the above method is characterized in that: the target signal includes a signal transmitted by a satellite other than a satellite to which the cell in which the first node resides belongs.

In one embodiment, the above method is characterized in that: a first receiving quality includes a Reference Signal Receiving Power (RSRP).

In one embodiment, the above method is characterized in that: the first measurement result includes a Reference Signal Receiving Quality (RSRQ).

In one embodiment, the above method is characterized in that: the first measurement result includes an RSRP of an SSB.

In one embodiment, the above method is characterized in that: the first measurement result includes an RSRQ of an SSB.

In one embodiment, the above method is characterized in that: the first measurement result includes an Angle of Arrival of the target signal.

In one embodiment, the above method is characterized in that: the first measurement result includes an elevation angle of the target signal.

In one embodiment, the above method is characterized in that: the first measurement result includes a delay.

In one embodiment, the above method is characterized in that: the first measurement result includes a Timing Advance (TA).

In one embodiment, the above method is characterized in that: the first measurement result includes a Doppler shift of the target signal.

In one embodiment, the above method is characterized in that: the target signal includes all SSBs in one SSB burst set, and the first measurement result includes RSRPs of all SSBs in the SSB burst set.

In one embodiment, the above method is characterized in that: the target signal includes an SSB in one SSB burst set, and the first measurement result includes an L1-RSRP of the SSB in the SSB burst set.

In one embodiment, the above method is characterized in that: the target signal includes an SSB in one SSB burst set, and the first measurement result includes an L3-RSRP of the SSB in the SSB burst set.

In one embodiment, the above method is characterized in that: the first measurement result includes a coordinate of the first node.

In one embodiment, the above method is characterized in that: the first measurement result includes geographical position information of the first node.

In one embodiment, the above method is characterized in that: the geometrical information includes a length and a width.

In one embodiment, the above method is characterized in that: the geometrical information includes a radius.

In one embodiment, the above method is characterized in that: the geometrical information includes a diameter.

In one embodiment, the above method is characterized in that: the geometrical information includes a coordinate.

In one embodiment, the above method is characterized in that: the geometrical information includes a vertex information.

In one embodiment, the above method is characterized in that: the geometrical information includes a number of areas.

In one embodiment, the above method is characterized in that: the geometrical information includes a shape of an area.

In one embodiment, the above method is characterized in that: the geometrical information includes a dimension of an area.

Specifically, according to one aspect of the disclosure, the first identifier set includes a Public Land Mobile Network (PLMN) identifier, and the target identifier includes an identifier in a PLMN identifier group selected by the first node.

In one embodiment, the above method is characterized in that: the first identifier set includes a PLMN identifier.

In one embodiment, the above method is characterized in that: the target identifier includes a PLMN identifier.

In one embodiment, the above method is characterized in that: the target identifier includes a selected PLMN.

In one embodiment, the above method is characterized in that: the target identifier includes a selectedPLMN-Identity.

In one embodiment, the above method is characterized in that: the target identifier includes an Equivalent PLMN (EPLMN) of a PLMN selected by the user.

In one embodiment, the above method is characterized in that: the target identifier includes a Home Public Land Mobile Network (HPLMN) identifier.

In one embodiment, the above method is characterized in that: the target identifier includes a Registered Public Land Mobile Network (RPLMN) identifier.

In one embodiment, the above method is characterized in that: the target identifier includes a Visited Public Land Mobile Network (VPLMN) identifier.

In one embodiment, the above method is characterized in that: the PLMN identifier group includes a PLMN.

In one embodiment, the above method is characterized in that: the PLMN identifier group includes a selected PLMN.

In one embodiment, the above method is characterized in that: the PLMN identifier group includes a registered PLMN.

In one embodiment, the above method is characterized in that: the PLMN identifier group includes a selectedPLMN-Identity.

In one embodiment, the above method is characterized in that: the PLMN identifier group includes an EPLMN.

In one embodiment, the above method is characterized in that: the PLMN identifier group includes a selected PLMN and all EPLMNs associated to the selected PLMN.

Specifically, according to one aspect of the disclosure, the first identifier set includes a country, and the target identifier includes a country.

In one embodiment, the above method is characterized in that: the first identifier set includes a Mobile Country Code (MCC).

In one embodiment, the above method is characterized in that: the MCC included in the first identifier set is indicated through a broadcasted PLMN.

In one embodiment, the above method is characterized in that: the target identifier includes an MCC included in a selected PLMN in a PLMN identifier group.

In one embodiment, the above method is characterized in that: the target identifier includes an MCC determined by a selected PLMN included in a PLMN identifier group.

In one embodiment, the above method is characterized in that: the target identifier includes an MCC determined by a selected EPLMN included in a PLMN identifier group.

In one embodiment, the above method is characterized in that: the target identifier includes an MCC determined by a selected HPLMN included in a PLMN identifier group.

In one embodiment, the above method is characterized in that: the target identifier includes an MCC determined by a selected VPLMN included in a PLMN identifier group.

In one embodiment, the above method is characterized in that: the target identifier includes an MCC of a country determined through location where the first node is located.

In one embodiment, the above method is characterized in that: the target identifier includes an MCC of a country determined through the first measurement result where the first node is located.

Specifically, according to one aspect of the disclosure, the first identifier set includes an identifier used for determining a first time-frequency resource set, and the second signal occupies the first time-frequency resource set; the target identifier includes an identifier used for determining a second time-frequency resource set, and the second time-frequency resource set is used for receiving the second signal.

In one embodiment, the above method is characterized in that: the first identifier set includes an SSB index.

In one embodiment, the above method is characterized in that: the first identifier set includes an SSB-index.

In one embodiment, the above method is characterized in that: the first identifier set includes a physCellId, and the target identifier includes a physCellId.

In one embodiment, the physCellId is a physical call to which the first time-frequency resource set belongs.

In one embodiment, the physCellId is a physical call to which the second time-frequency resource set belongs.

In one embodiment, the above method is characterized in that: the first identifier set includes an ssb-PositionsInBurst.

In one embodiment, the above method is characterized in that: the first identifier set includes an SSB index indicated through a bitmap.

In one embodiment, the above method is characterized in that: the first identifier set includes a Cell Defining SSB index (CD SSB index).

In one embodiment, the above method is characterized in that: the target identifier includes an SSB index corresponding to a time-frequency resource selected by the first node to receive an SIB1.

In one embodiment, the above method is characterized in that: the target identifier includes an SSB index of a beam selected by the first node to receive an SIB1.

In one embodiment, the above method is characterized in that: the target identifier includes an SSB index of a beam determined by the first node when selecting a cell.

In one embodiment, the SSB includes a Synchronization Signal\Physical Broadcast Channel (SS\PBCH) block.

In one embodiment, the above method is characterized in that: the first identifier set includes a time domain index of the first time-frequency resource set.

In one embodiment, the above method is characterized in that: the target identifier includes a time domain index of the second time-frequency resource set.

In one embodiment, the above method is characterized in that: the first identifier set includes a frequency domain index of the first time-frequency resource set.

In one embodiment, the above method is characterized in that: the target identifier includes a frequency domain index of the second time-frequency resource set.

In one embodiment, the above method is characterized in that: the first identifier set includes an index corresponding to a pdsch-TimeDomainAllocationList used for determining the time-domain resources of the first time-frequency resource set.

In one embodiment, the above method is characterized in that: the target identifier includes an index corresponding to a pdsch-TimeDomainAllocationList used for determining the time-domain resources of the second time-frequency resource set.

In one embodiment, the above method is characterized in that: the target identifier includes a search space which is used for detecting a PDCCH indicating the second signal.

In one embodiment, the above method is characterized in that: the first identifier set includes a search space which is used for detecting a PDCCH indicating the second signal.

Specifically, according to one aspect of the disclosure, the first identifier set includes a tracking area code, and target identifier includes a tracking area code registered by the first node.

In one embodiment, the above method is characterized in that: the tacking area code includes a Tacking Area Code (TAC).

In one embodiment, the above method is characterized in that: the target identifier includes a TAC determined by a Registration Accept message received by the first node.

In one embodiment, the above method is characterized in that: the target identifier includes a TAC determined by a Configuration Update Command message received by the first node.

Specifically, according to one aspect of the disclosure, the first identifier set includes a tracking area code, and the target identifier includes a tracking area code registered by the first node.

In one embodiment, the above method is characterized in that: the tracking area code includes a Tracking Area Identity (TAI).

In one embodiment, the above method is characterized in that: the target identifier includes a TAI indicated by a Registration Accept message received by the first node.

In one embodiment, the above method is characterized in that: the target identifier includes a TAI indicated by a Configuration Update Command message received by the first node.

In one embodiment, the second signal occupies the second time-frequency resource set.

In one embodiment, the second signal occupies the first time-frequency resource set.

In one embodiment, when the first identifier set includes the target identifier, the first time-frequency resource set includes the second time-frequency resource set.

Specifically, according to one aspect of the disclosure, the first identifier set includes network slice assistance information, and the target identifier includes network slice assistance information allowed for the first node.

In one embodiment, the above method is characterized in that: the network slice assistance information includes Network Slice Selection Assistance Information (NSSAI).

In one embodiment, the above method is characterized in that: the target identifier includes an allowed NSSAI indicated by a Configuration Update Command message received by the first node.

In one embodiment, the above method is characterized in that: the target identifier includes an allowed NSSAI indicated by a Registration Accept message received by the first node.

Specifically, according to one aspect of the disclosure, the method includes:

the second receiver receives a second identifier set, the first identifier set is a subset of the second identifier set, the second identifier set may be used for associating to information other than the second information, and the second identifier set is used for determining the first identifier set.

In one embodiment, the above method is characterized in that: the second identifier set includes a PLMN, and the PLMN indicated by the second identifier set is used for an RRCSetupComplete message.

In one embodiment, the above method is characterized in that: the second identifier set includes a PLMN, and the second identifier set is used for indicating a barred access of a user.

In one embodiment, the above method is characterized in that: the second identifier set includes a PLMN, and the second identifier set is used by a CGI-InfoNR signaling to indicate an identifier of a cell group.

In one embodiment, the above method is characterized in that: the second identifier set includes a PLMN, and the second identifier set is used by a CGI-InfoNR signaling to indicate an identifier of a cell group.

In one embodiment, the above method is characterized in that: the second identifier set includes a physCellId, and the physCellId is used by an SSB-MTC to configure a measurement.

Specifically, according to one aspect of the disclosure, the first identifier set is related to a transmission sequence of an identifier in the second identifier set.

In one embodiment, the above method is characterized in that: the second identifier set is indicated by an RRC signaling; the transmission sequence of the identifier in the second identifier set includes a numbering sequence of the second identifier set appearing in the RRC signaling.

In one embodiment, the above method is characterized in that: the transmission sequence of the identifier in the second identifier set includes a packaging sequence of the identifier in the second identifier set.

In one embodiment, the above method is characterized in that: the transmission sequence of the identifier in the second identifier set includes a sequence from MSB to LSB formed by a bit string in a packaged PDU corresponding to the identifier in the second identifier set.

In one embodiment, the above method is characterized in that: the transmission sequence of the identifier in the second identifier set includes a relative position of the identifier in the second identifier set in the data generated after ASN.1 coding, the earliest one is the first.

In one embodiment, the above method is characterized in that: the second identifier set includes N identifier(s), the first identifier set is composed of previous K identifier(s) among the N identifier(s) that are obtained according to the transmission sequence, wherein the N is a positive integer, the K is a positive integer less than or equal to N.

In one embodiment, the above method is characterized in that: the second identifier set includes M identifier(s), the first identifier set is composed of last L identifier(s) among the M identifier(s) that are obtained according to the transmission sequence, wherein the M is a positive integer, the L is a positive integer less than or equal to N.

Specifically, according to one aspect of the disclosure, the first information includes system information, and a triggering of a system information change notification is unrelated to whether the first identifier set changes.

In one embodiment, the above method is characterized in that: the system information includes an SIB.

In one embodiment, the above method is characterized in that: the system information change notification includes system information change notifications.

In one embodiment, the above method is characterized in that: the system information change notification includes a triggering of paging.

In one embodiment, the above method is characterized in that: the system information change notification is not triggered when the first identifier set changes.

Specifically, according to one aspect of the disclosure, the first node is a UE.

Specifically, according to one aspect of the disclosure, the first node is an IoT terminal.

Specifically, according to one aspect of the disclosure, the first node is a relay.

Specifically, according to one aspect of the disclosure, the first node is a vehicle terminal.

Specifically, according to one aspect of the disclosure, the first node is an air vehicle.

The disclosure provides a method in a second node for wireless communication, wherein the method includes:

transmitting a first signal and a second signal, the first signal carrying first information, and the second signal carrying second information.

Herein, the first information includes information of an access stratum, the first information is used for indicating a first identifier set, and the first identifier set includes a positive integer number of identifiers; the first identifier set is associated to the second information; the second information includes information of an non-access stratum; whether the first identifier set includes a target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

Specifically, according to one aspect of the disclosure, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal neglects the second information.

Specifically, according to one aspect of the disclosure, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal receives the second signal, the non-access stratum information carried by the second information is forwarded to the non-access stratum, and the receiver of the first signal does not indicate to a user a content of a warning message included in the non-access stratum information carried by the second information.

Specifically, according to one aspect of the disclosure, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal receives the second signal, the non-access stratum information carried by the second information is forwarded to the non-access stratum, the receiver of the first signal does not indicate to a user a content of a warning message included in the non-access stratum information carried by the second information, and the receiver of the first signal stores the warning message included in the non-access stratum information carried by the second information.

Specifically, according to one aspect of the disclosure, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal receives the second signal, the non-access stratum information carried by the second information is forwarded to the non-access stratum, and invalid information of the second information is forwarded to the non-access stratum.

Specifically, according to one aspect of the disclosure, the first signal and the second signal occupy different time-frequency resources.

Specifically, according to one aspect of the disclosure, the first signal carries first area configuration information, the first area configuration information includes geometrical information of an area, and the first area configuration information is used for determining the target identifier.

Specifically, according to one aspect of the disclosure, the method includes:

the second transmitter transmits a target signal, wherein the target signal is used for determining a first measurement result, and the first measurement result is used for determining the target identifier.

Specifically, according to one aspect of the disclosure, the first identifier set includes a PLMN identifier, and the target identifier includes an identifier in a PLMN identifier group selected by the receiver of the first signal.

Specifically, according to one aspect of the disclosure, the first identifier set includes a county, and the target identifier includes a country.

Specifically, according to one aspect of the disclosure, the first identifier set includes an identifier used for determining a first time-frequency resource set, and the second signal occupies the first time-frequency resource set; the target identifier includes an identifier used for determining a second time-frequency resource set, and the second time-frequency resource set is used for receiving the second signal.

Specifically, according to one aspect of the disclosure, the first identifier set includes a tracking area code, and the target identifier includes a tracking area code registered by the receiver of the first signal.

Specifically, according to one aspect of the disclosure, the first identifier set includes a tracking area identity, and the target identifier includes a tracking area identity registered by the receiver of the first signal.

Specifically, according to one aspect of the disclosure, the first identifier set includes network slice assistance information, and the target identifier includes network slice assistance information allowed for the receiver of the first signal.

Specifically, according to one aspect of the disclosure, the method includes:

the second transmitter transmits a second identifier set, the first identifier set is a subset of the second identifier set, the second identifier set may be used for associating to information other than the second information, and the second identifier set is used for determining the first identifier set.

Specifically, according to one aspect of the disclosure, the first identifier set is related to a transmission sequence of an identifier in the second identifier set.

Specifically, according to one aspect of the disclosure, the first information includes system information, and a triggering of a system information change notification is unrelated to whether the first identifier set changes.

Specifically, according to one aspect of the disclosure, the second node is a base station.

Specifically, according to one aspect of the disclosure, the second node is a relay.

Specifically, according to one aspect of the disclosure, the second node is a vehicle terminal.

Specifically, according to one aspect of the disclosure, the second node is an air vehicle.

Specifically, according to one aspect of the disclosure, the second node is a group header.

Specifically, according to one aspect of the disclosure, the second node is a satellite.

The disclosure provides a first node for wireless communication, wherein the first node includes:

a first receiver, to determine a target identifier; and a second receiver, to receive a first signal, the first signal carrying first information.

Herein, the first information includes information of an access stratum, the first information is used for indicating a first identifier set, and the first identifier set includes a positive integer number of identifiers; the first identifier set is associated to second information; a second signal carries the second information, and the second information includes information of a non-access stratum; whether the first identifier set includes the target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

The disclosure provides a second node for wireless communication, wherein the second node includes:

a second transmitter, to transmit a first signal and a second signal, the first signal carrying first information, and the second signal carrying second information.

Herein, the first information includes information of an access stratum, the first information is used for indicating a first identifier set, and the first identifier set includes a positive integer number of identifiers; the first identifier set is associated to the second information; the second information includes information of an non-access stratum; whether the first identifier set includes a target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the disclosure has the following advantages compared with conventional schemes.

When cells are large, especially NTN cells, the coverages of each cell and the beam within each cell are large, which may even be larger than the size of a tracking area. This is completely different from the conventional concept. In the conventional concept, one cell belongs to one tracking area only, that is, the tracking area is larger than the cell, and different beams within one cell have the same system information, which are the understanding and assumption for formulating current 5G NR system protocols. In conventional systems, services are generally deployed with a TA as a unit, the deployment of services can be specified in some TA, a TA includes a plurality of cells, and a base station only needs to broadcast these services in relevant cells; however, when cells are large, even larger than the coverage of the TA, the broadcast of services in the whole cell will cause unrelated users to receive these services; for services like ETWS, error receiving, particularly large-scale error receiving, might cause unnecessary panic of the public. On the other hand, for a long time, it is understood that a cell belongs to one TA in all systems, including 5G NR systems; during the design of a system, each layer is relatively independent, which is helpful to simplify design and enhance robustness; therefore, the hypothesis to comprehensively deny the previous system design will bring in huge complexity. In addition, some schemes require the terminal equipment have additional capabilities, for example, GPS positioning capability, and the applications of these schemes are also limited. Therefore, it is very necessary to introduce a simple method to support the deployment of broadcast services in part areas of a large cell. The disclosure indicates the first identifier set through the first information; on the other hand, the user determines the target identifier; only when the determined target identifier belongs to the first identifier set, the broadcast service is considered to be valid and received, or the received broadcast service data is considered to be valid. This scheme has advantages that the application scope is very wide, the complexity is very low and the impact to the system is small.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
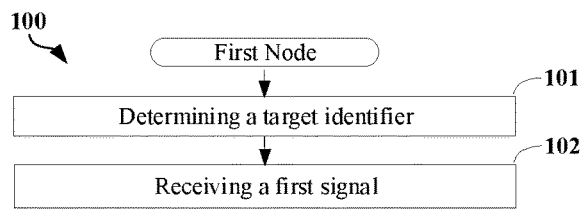
FIG. 1 is a flowchart of determining a target identifier and receiving a first signal according to one embodiment of the disclosure.

Embodiment 1 illustrates a flowchart of determining a target identifier and receiving a first signal according to one embodiment of the disclosure, a shown in FIG. 1. In FIG. 1, each box represents one step. It is important to emphasize that the order of the boxes in the diagram does not represent a sequential relationship in time between the steps represented.

In Embodiment 1, the first node in the disclosure determines a target identifier in S101 and receives a first signal in S102, the first signal carrying first information.

Herein, the first information includes information of an access stratum, the first information is used for indicating a first identifier set, and the first identifier set includes a positive integer number of identifiers; the first identifier set is associated to second information; a second signal carries the second information, and the second information includes information of a non-access stratum; whether the first identifier set includes the target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the first node is a User Equipment (UE).

In one embodiment, a transmitter of the first signal is the second node.

In one embodiment, the target identifier includes a PLMN selected by the first node.

In one embodiment, the target identifier includes any one of a PLMN and an EPLMN selected by the first node.

In one embodiment, the target identifier includes a VPLMN selected by the first node.

In one embodiment, the target identifier includes an RPLMN selected by the first node.

In one embodiment, the target identifier includes an HPLMN selected by the first node.

In one embodiment, the target identifier includes an MCC determined by a PLMN selected by the first node.

In one embodiment, the target identifier includes a TAC of a tracking area registered by the first node.

In one embodiment, the target identifier includes a TAI of a tracking area registered by the first node.

In one embodiment, the target identifier includes a CellIdentity of a cell selected by the first node.

In one embodiment, the target identifier includes a physical cell ID of a physical cell selected by the node.

In one embodiment, the target identifier includes an index of an SSB selected by the first node associated to a received SIB1.

In one embodiment, the target identifier includes an index of an SSB selected by the first node associated to time-frequency resources carrying an SIB1.

In one embodiment, the target identifier includes an index of an SSB selected by the first node on a beam of a received SIB1.

In one embodiment, the target identifier includes an index of a received SSB used by the first node to perform cell selection and reselection.

In one embodiment, the target identifier includes a coordinate of the first node.

In one embodiment, the target identifier includes an identifier of an area to which the first node belongs.

In one embodiment, the target identifier includes a relative position of the first node to a point A.

In one embodiment, the point A includes a center point of the cell.

In one embodiment, the point A includes a point on the earth.

In one embodiment, the point A includes a point specified by the home cell.

In one embodiment, the target identifier includes an NSSAI allowed for the first node.

In one embodiment, the target identifier includes an S-NSSAI in an NSSAI allowed for the first node.

In one embodiment, the target identifier includes an access category specified for the first node.

In one embodiment, the target identifier includes an access class specified for the first node.

Embodiment 2

Figure 2:
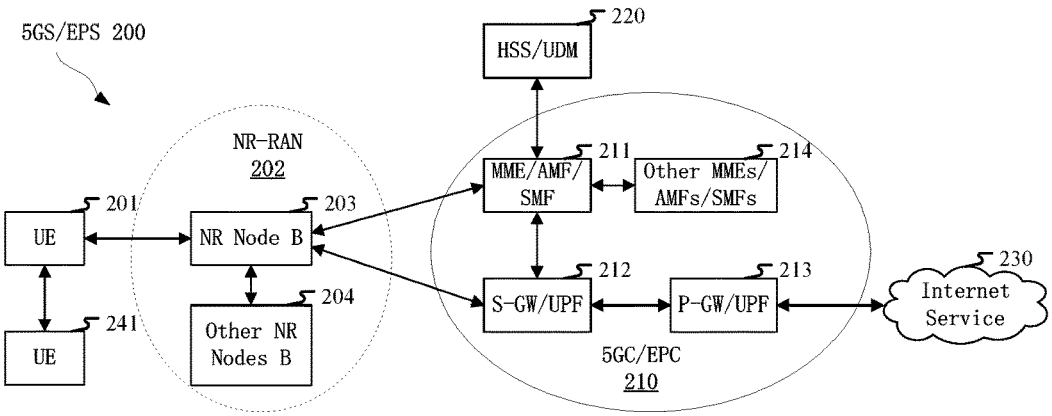
FIG. 2 is a diagram illustrating a network architecture according to one embodiment of the disclosure.

Embodiment 2 illustrates a diagram of a network architecture according to the disclosure, as shown in FIG. 2.

FIG. 2 is a diagram illustrating a network architecture 200 of 5G NR, Long-Term Evolution (LTE), Long-Term Evolution Advanced (LTE-A) systems. The 5G NR or LTE network architecture 200 may be called a 5G System (5GS)/Evolved Packet System (EPS) 200 or some other appropriate terms. The 5GS/EPS 200 may include one or more UEs 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS may be interconnected with other access networks. For simple description, the entities/interfaces are not shown. As shown in FIG. 2, the 5GS/EPS provides packet switching services. Those skilled in the art are easy to understand that various concepts presented throughout the present disclosure may be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistants (PDAs), Satellite Radios, non-terrestrial base station communications, satellite mobile communications, Global Positioning Systems (GPSs), multimedia devices, video devices, digital audio player (for example, MP3 players), cameras, games consoles, unmanned air-interface vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 includes a Mobility Management Entity/Authentication Management Field/Session Management Function (MME/AMF/SMF) 211, other MMEs/AMFs/SMFs 214, a Service Gateway/User Plane Function (S-GW/UPF) 212 and a Packet Data Network Gateway/UPF (P-GW/UPF) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet service 230. The Internet service 230 includes IP services corresponding to operators, specifically including Internet, Intranet, IP Multimedia Subsystems (IMSs) and Packet Switching Streaming Services (PSSs).

In one embodiment, the UE 201 corresponds to the first node in the disclosure.

In one embodiment, the UE 201 supports transmission in an NTN.

In one embodiment, the UE 201 supports transmission in a large-latency network.

In one embodiment, the UE 201 supports V2X transmission.

In one embodiment, the gNB 203 corresponds to the second node in the disclosure.

In one embodiment, the gNB 203 supports transmission in an NTN.

In one embodiment, the gNB 203 supports transmission in a large-latency network.

In one embodiment, the gNB 203 supports V2X transmission.

Embodiment 3

Figure 3:
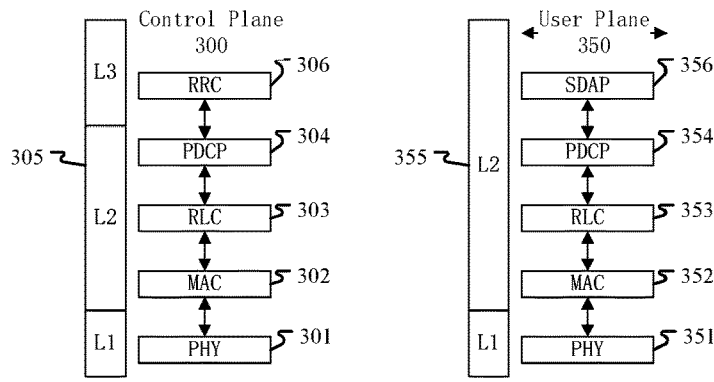
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first node (UE, gNB or satellite or air vehicle in NTN) and a second node (gNB, UE or satellite or air vehicle in NTN) or between two UEs is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first node and the second node and between two UEs over the PHY 301. The L2 Layer 305 includes a Medium Access Control (MAC) sublayer 302, a Radio Link Control (RLC) sublayer 303, and a Packet Data Convergence Protocol (PDCP) sublayer 304, which are terminated at the second node. The PDCP sublayer 304 provides multiplexing between different radio bearers and logical channels. The PDCP sublayer 304 also provides security by encrypting packets and provides support for handover of the first node between second nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first node. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second node and the first node. The radio protocol architecture of the user plane 350 includes a Layer 1 (L1 layer) and a Layer 2 (L2 layer); the radio protocol architecture for the first node and the second node in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first node may include several higher layers above the L2 Layer 355, including an NAS sublayer. The NAS sublayer is responsible for the data and control of a non-access layer; the signaling and data of the NAS sublayer may be packaged in an RRC message. It further includes a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first signal in the disclosure is generated on the PHY 301.

In one embodiment, the second signal in the disclosure is generated on the PHY 301.

In one embodiment, the first information in the disclosure is generated on the PHY 301 or MAC 302 or RRC 306 or NAS.

In one embodiment, the second information in the disclosure is generated on the MAC 302 or RRC 306 or NAS.

In one embodiment, the target signal in the disclosure is generated on the PHY 301 or MAC 302 or RRC 306.

In one embodiment, the second identifier set in the disclosure is generated on the PHY 301 or MAC 302 or RRC 306.

Embodiment 4

Figure 4:
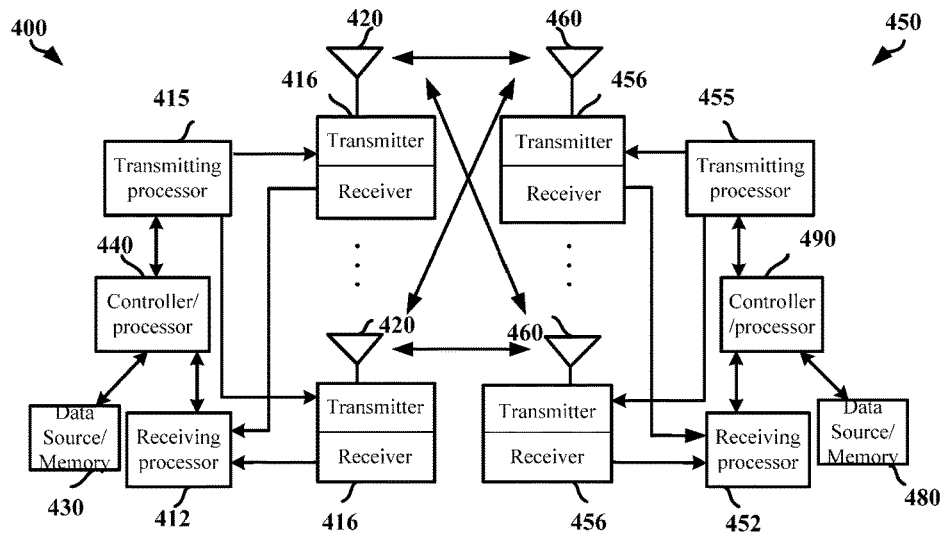
FIG. 4 is a diagram illustrating a first node and a second node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication equipment 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least determines a target identifier, and receives a first signal, the first signal carrying first information; wherein the first information includes information of an access stratum, the first information is used for indicating a first identifier set, and the first identifier set includes a positive integer number of identifiers; the first identifier set is associated to second information; a second signal carries the second information, and the second information includes information of a non-access stratum; whether the first identifier set includes the target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the first communication equipment 450 includes a memory that stores a computer readable instruction program. The computer readable instruction program generates an action when executed by at least one processor. The action includes: determining a target identifier, and receiving a first signal, the first signal carrying first information; wherein the first information includes information of an access stratum, the first information is used for indicating a first identifier set, and the first identifier set includes a positive integer number of identifiers; the first identifier set is associated to second information; a second signal carries the second information, and the second information includes information of a non-access stratum; whether the first identifier set includes the target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first signal and a second signal, the first signal carrying first information, and the second signal carrying second information; wherein the first information includes information of an access stratum, the first information is used for indicating a first identifier set, and the first identifier set includes a positive integer number of identifiers; the first identifier set is associated to the second information; the second information includes information of an non-access stratum; whether the first identifier set includes a target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the second communication equipment 410 includes a memory that stores a computer readable instruction program. The computer readable instruction program generates an action when executed by at least one processor. The action includes: transmitting a first signal and a second signal, the first signal carrying first information, and the second signal carrying second information; wherein the first information includes information of an access stratum, the first information is used for indicating a first identifier set, and the first identifier set includes a positive integer number of identifiers; the first identifier set is associated to the second information; the second information includes information of an non-access stratum; whether the first identifier set includes a target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the first communication equipment 450 corresponds to the first node in the disclosure.

In one embodiment, the second communication equipment 410 corresponds to the second node in the disclosure.

In one embodiment, the first communication equipment 450 is one UE.

In one embodiment, the first communication equipment 450 is one vehicle terminal.

In one embodiment, the second communication equipment 410 is one base station.

In one embodiment, the second communication equipment 410 is one UE.

In one embodiment, the second communication equipment 410 is one satellite.

In one embodiment, the receiver 456 (including antenna 460), the receiving processor 452 and the controller/processor 490 are used for receiving the first signal in the disclosure.

In one embodiment, the receiver 456 (including antenna 460), the receiving processor 452 and the controller/processor 490 are used for receiving the second signal in the disclosure.

In one embodiment, the receiver 456 (including antenna 460), the receiving processor 452 and the controller/processor 490 are used for receiving the target signal in the disclosure.

In one embodiment, the receiver 456 (including antenna 460), the receiving processor 452 and the controller/processor 490 are used for receiving the second identifier set in the disclosure.

In one embodiment, the transmitter 416 (including antenna 420), the transmitting processor 412 and the controller/processor 440 are used for transmitting the first signal in the disclosure.

In one embodiment, the transmitter 416 (including antenna 420), the transmitting processor 412 and the controller/processor 440 are used for transmitting the second signal in the disclosure.

In one embodiment, the transmitter 416 (including antenna 420), the transmitting processor 412 and the controller/processor 440 are used for transmitting the target signal in the disclosure.

In one embodiment, the transmitter 416 (including antenna 420), the transmitting processor 412 and the controller/processor 440 are used for transmitting the second identifier set in the disclosure.

Embodiment 5

Figure 5:
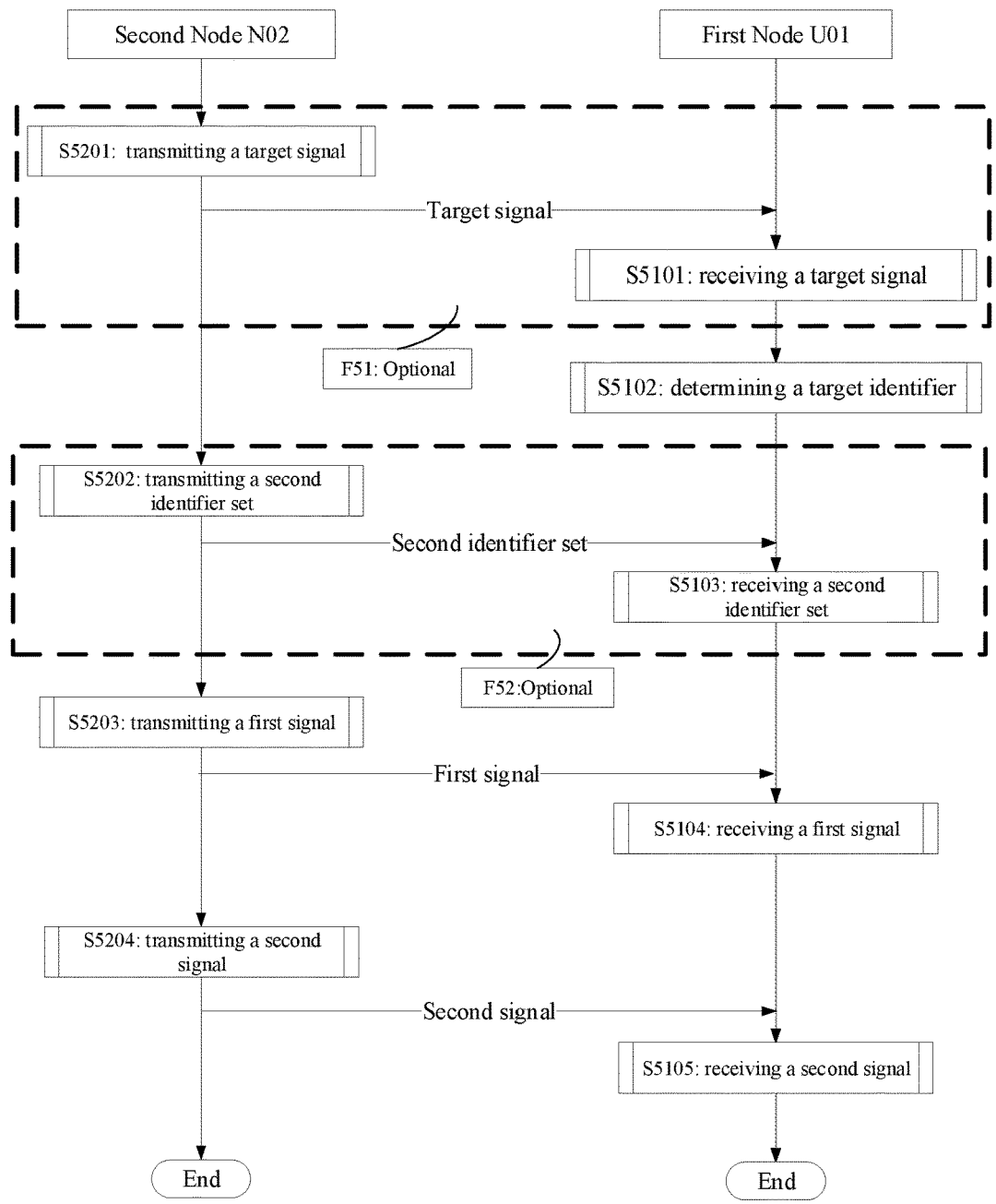
FIG. 5 is a flowchart of transmission according to one embodiment of the disclosure.

Embodiment 5 illustrates a flowchart of transmission of a radio signal according to one embodiment of the disclosure, as shown in FIG. 5. In FIG. 5, a second node N02 is a base station of a serving cell of a first node U01. In particular, the order in this example does not limit the order in which signals are transmitted and implemented in the disclosure. Steps in F51 and F52 are optional.

The second node N02 transmits a target signal in S5201.

The first node U01 receives a target signal in S5101; the target signal is used for determining a first measurement result, and the first measurement result is used for determining the target identifier.

In one embodiment, the first node U01 determines a target identifier in S5102.

In one embodiment, the target signal includes an SSB.

In one embodiment, the target signal includes an SS\PBCH.

In one embodiment, the target signal includes a satellite signal used for locating.

In one embodiment, the first measurement result includes an intensity of the target signal, the first measurement result is used for determining a resident cell, the first node U01 receives in the resident cell the system information relevant to the resident cell, and the system information includes an identifier used for determining the target identifier.

In one embodiment, the target identifier includes a PLMN.

In one embodiment, the target identifier includes an identifier of a tracking area belonging to the selected PLNM.

In one embodiment, the target identifier includes a TAC of a tracking area belonging to the selected PLNM.

In one embodiment, the target identifier includes a TAI of a tracking area belonging to the selected PLNM.

In one embodiment, the first measurement result includes an azimuth angle between the second node N02 and the first node U01.

In one embodiment, the first measurement result includes an elevation angle between the second node N02 and the first node U01.

In one embodiment, the second node N02 includes an NTN satellite, and the target signal includes an ephemeris of the second node N02.

In one embodiment, the first measurement result includes a spatial position of the second node N02.

In one embodiment, the first measurement result includes an true anomaly of the second node N02.

In one embodiment, the first measurement result includes an eccentricity of the second node N02.

In one embodiment, the ephemeris of the first node U01 is used for estimating a current time.

In one embodiment, the azimuth angle of the first node U01 is used for estimating a current time.

In one embodiment, the target identifier includes a time value, and the first identifier set includes a time value.

In one embodiment, the second node N02 is at different spatial positions at different time, and covers different areas.

In one embodiment, the eccentricity included in the measurement result is used for determining a shape of an orbit; in combination with the current time, the first measurement result is used for determining distances from a perigee and an apogee to a geocentre and a distance difference; the distances and the distance difference are used for calculating a size of a coverage of the second node N02 on the earth surface; the size of the coverage is used for estimating whether the serving cell of the first node U01 can cover a valid area of the second information; when the first node U01 is located in the coverage area of the second node N02 at the perigee, the target identifier is a cell ID; when the first node U01 is located beyond the coverage area of the second node N02 at the perigee, the target identifier is an identifier other than the cell ID.

In one embodiment, the target identifier includes a time scope, the first identifier set includes a time scope, and when the time scope included in the target identifier is contained in the time scope included in the first identifier set, the first identifier set includes the target identifier.

In one embodiment, the second node N02 transmits a second identifier set in S5202, the first identifier set is a subset of the second identifier set, the second identifier set may be used for associating to information other than the second information, and the second identifier set is used for determining the first identifier set.

In one embodiment, the first node U01 receives the second identifier set in S5103.

In one embodiment, the second identifier set includes a PLMN-IdentityInfoList transmitted in an SIB1.

In one embodiment, the second identifier set includes a plmn-IdentityList transmitted in an SIBL In one embodiment, the second identifier set includes a TAC in a PLMN-IdentityInfoList transmitted in an SIB1.

In one embodiment, the second identifier set includes an RAN-AreaCode in a plmn-IdentityList transmitted in an SIBL In one embodiment, the second identifier set includes an SSB indicated by an ssb-PositionsInBurst transmitted in an SIBL In one embodiment, the second identifier set includes an IntraFreqNeighCellList transmitted in an SIB3.

In one embodiment, the second identifier set includes a physCellId in an IntraFreqNeighCellList transmitted in an SIB3.

In one embodiment, the second identifier set includes an InterFreqNeighCellList transmitted in an SIB4.

In one embodiment, the second identifier set includes a physCellId in an InterFreqNeighCellList transmitted in an SIB4.

In one embodiment, the second identifier set includes an area list.

In one embodiment, the second identifier set includes an area in an area configuration.

In one embodiment, the first identifier set includes an index of an identifier in the second identifier set.

In one embodiment, the second node N02 transmits a first signal in S5201, and the first signal carries first information.

In one embodiment, the first node U01 receives a first signal in S5104, and the first signal carries first information.

Herein, the first information includes information of an access stratum, the first information is used for indicating a first identifier set, and the first identifier set includes a positive integer number of identifiers; the first identifier set is associated to second information; a second signal carries the second information, and the second information includes information of a non-access stratum; whether the first identifier set includes the target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, the first identifier set is used for mobility management of an access stratum.

In one embodiment, the first identifier set is carried by an RRC message of an access stratum.

In one embodiment, the first identifier set is used for signal reception of an access stratum.

In one embodiment, the first identifier set is used for information processing of an access stratum.

In one embodiment, the first identifier set is stored in a base station.

In one embodiment, the first identifier set is used for receiving the second information.

In one embodiment, the first identifier set is used for determining time-frequency resources occupied by the second information.

In one embodiment, the first identifier set is used for determining a valid area of the second information.

In one embodiment, the first identifier set is used for determining a valid condition for receiving the second information.

In one embodiment, the second node N02 transmits a second signal in S5204.

In one embodiment, the first node U01 receives a second signal in S5105, wherein the second signal carries the second information.

Embodiment 6

Figure 6:
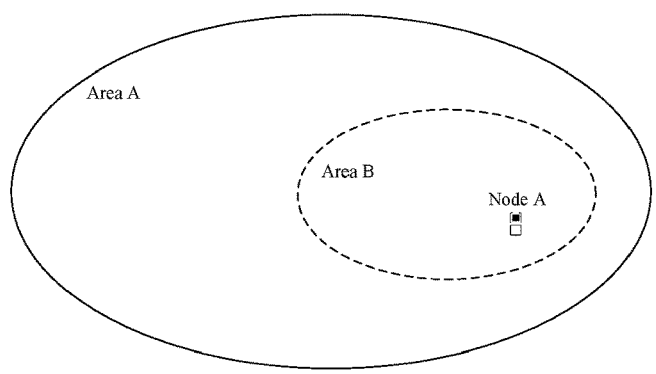
FIG. 6 is a diagram of determining a target identifier and a validity according to one embodiment of the disclosure.

Embodiment 6 illustrates a diagram of determining a target identifier and a validity according to one embodiment of the disclosure, as shown in FIG. 6. In FIG. 6, an area A is an area marked by a full line, an area B is an area marked by a dash line, a Node A corresponds to the first node in the disclosure, and the node A is located in the area B. In particular, it needs to be emphasized that the specific shape of the area drawn in the diagram is only used for further elaboration of the technical scheme of the disclosure, and the implementation of the technical scheme of the disclosure is not restricted by the specific shape of the area drawn in the diagram.

In one embodiment, the area A corresponds to one cell, the area B corresponds to a Tracking Area (TA) targeted by the second information, and the node A is located in the area targeted by the second information; the node A is in an RRC_IDLE state; the node A learns that an ETWS message will be published by detecting a PDCCH channel scrambled with a P-RNTI; the first information includes an SIB1, the first signal is a radio signal carrying the SIB1, the node A reads the SI-SchedulingInfo of the SIB1, the SI-SchedulingInfo indicates a valid TA list for the ETWS message, the first identifier set includes a TAC determined by the valid TA list for the ETWS message, and a TAC corresponding to a PLMN selected by the node A, which is included in the SIB1 message acquired by the node A, is determined as a target identifier; the first identifier set includes the target identifier, and the second information is determined to be valid.

In one embodiment, the area A corresponds to one cell, the area B corresponds to an area targeted by the second information, the area B is covered by one beam of the cell corresponding to the area A, and the node A is located in the area targeted by the second information; the node A is in an RRC_Inactive state; the node A learns that an ETWS message will be published by detecting a PDCCH channel scrambled with a P-RNTI; the first information includes an SIB1, the first signal is a radio signal carrying the SIB1, the node A reads the SI-SchedulingInfo of the SIB1, the SI-SchedulingInfo indicates an SSB index list corresponding to a valid area for the ETWS message, the first identifier set includes an SSB index included in the SSB index list, an index of an SSB associated to the SIB1 acquired by the node A is determined as a target identifier, the first identifier set includes the target identifier, and the second information is determined to be valid.

In one embodiment, the node A keeps synchronized with one SSB when selecting a cell and acquires an index of the synchronized SSB, and detects a PDCCH through a search space indicated by the synchronized SSB; the detected PDCCH indicates an SIB1 message, and the node A hereby acquires the SIB1 message.

In one embodiment, the area A corresponds to one cell, the area B corresponds to a geographical area targeted by the second information, and the node A is located in the geographical area targeted by the second information; the node A is in an RRC_IDLE state; the node A learns that an ETWS message will be published by detecting a PDCCH channel scrambled with a P-RNTI; the first information includes a DCI carried by the PDCCH scrambled with the P-RNTI, the node A reads an index of a PLMN in the SIB1 indicated by the DCI, the first identifier set includes an MCC of a country of the same PLMN as determined by the indicated index of PLMN, the node A determines a country where it is through location, the target identifier includes an MCC of the country determined through location where it is; the first identifier set includes the target identifier, and the second information is determined to be valid.

Embodiment 7

Figure 7:
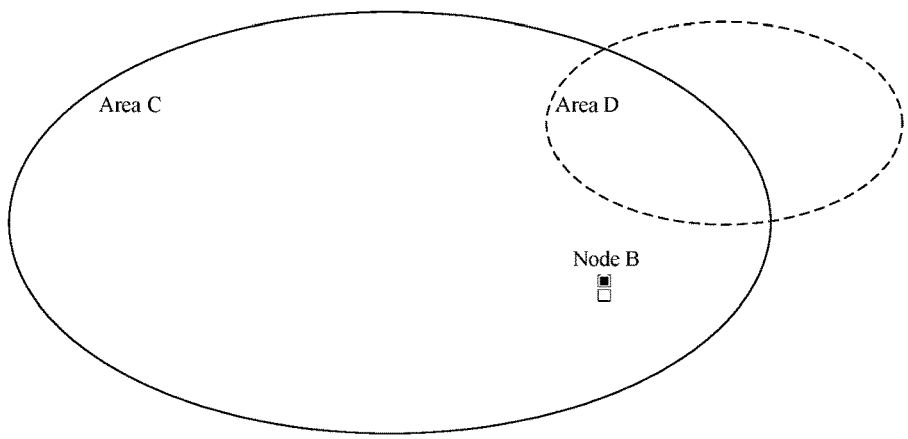
FIG. 7 is a diagram of determining a target identifier and a validity according to one embodiment of the disclosure.

Embodiment 7 illustrates a diagram of determining a target identifier and a validity according to one embodiment of the disclosure, as shown in FIG. 7. In FIG. 7, an area C is an area marked by a full line, an area D is an area marked by a dash line, a Node B corresponds to the first node in the disclosure, and the node B is located in the area C but beyond the area D. In particular, it needs to be emphasized that the specific shape of the area drawn in the diagram is only used for further elaboration of the technical scheme of the disclosure, and the implementation of the technical scheme of the disclosure is not restricted by the specific shape of the area drawn in the diagram.

In one embodiment, the area C corresponds to one cell, the area D corresponds to a Tracking Area (TA) targeted by the second information, and the node B is located outside the area targeted by the second information; the node B is in an RRC_IDLE state; the node B learns that an ETWS message will be published by detecting a PDCCH channel scrambled with a P-RNTI; the first information includes an SIB1, the first signal is a radio signal carrying the SIB1, the node B reads the SI-SchedulingInfo of the SIB1, the SI-SchedulingInfo indicates a valid TA list for the ETWS message, the first identifier set includes a TAC determined by the valid TA list for the ETWS message, and a TAC corresponding to a PLMN selected by the node B included in the SIB1 message acquired by the node B is determined as a target identifier; the first identifier set does not include the target identifier, and the second information is determined to be invalid.

In one embodiment, the area C corresponds to one cell, the area D corresponds to an area targeted by the second information, the area D is covered by one beam of the cell corresponding to the area C, and the node B is located outside the area targeted by the second information; the node B is in an RRC_Inactive state; the node B learns that an ETWS message will be published by detecting a PDCCH channel scrambled with a P-RNTI; the first information includes an SIB1, the first signal is a radio signal carrying the SIB1, the node B reads the SI-SchedulingInfo of the SIB1, the SI-SchedulingInfo indicates an SSB index list corresponding to a valid area for the ETWS message, the first identifier set includes an SSB index included in the SSB index list, an index of an SSB associated to the SIB1 acquired by the node B is determined as a target identifier, the first identifier set does not include the target identifier, and the second information is determined to be invalid.

In one embodiment, the node B keeps synchronized with one SSB when selecting a cell and acquires an index of the synchronized SSB, and detects a PDCCH through a search space indicated by the synchronized SSB; the detected PDCCH indicates an SIB1 message.

In one embodiment, the area C corresponds to one cell, the area D corresponds to a geographical area targeted by the second information, and the node B is located outside the geographical area targeted by the second information; the node B is in an RRC_IDLE state; the node B learns that an ETWS message will be published by detecting a PDCCH channel scrambled with a P-RNTI; the first information includes a DCI carried by the PDCCH scrambled with the P-RNTI, the node B reads an index of a PLMN in the SIB1 indicated by the DCI, the first identifier set includes an MCC of a country of the same PLMN as determined by the indicated index of PLMN, the node B determines a country where it is through location, the target identifier includes an MCC of the country determined through location where it is; the first identifier set does not include the target identifier, and the second information is determined to be invalid.

Embodiment 8

Figure 8:
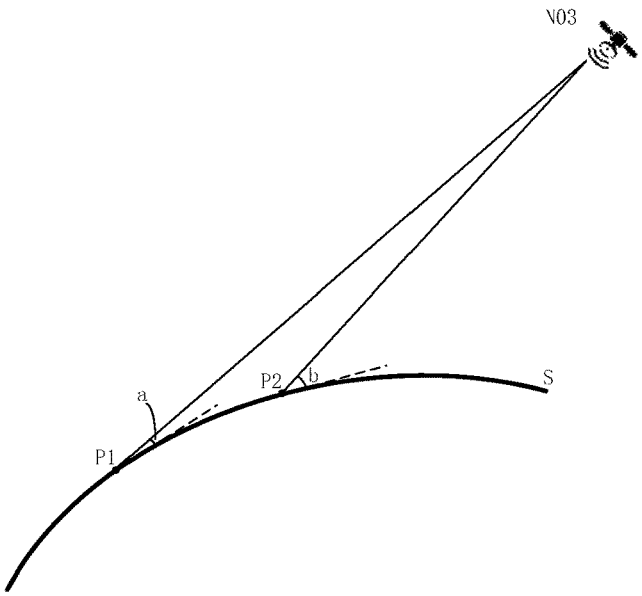
FIG. 8 is a diagram illustrating a scenario in which a first measurement result is used for determining a target identifier according to one embodiment of the disclosure.

Embodiment 8 illustrates a diagram of a scenario in which a first measurement result is used for determining a target identifier according to one embodiment of the disclosure, as shown in FIG. 8.

In one embodiment, a node N03 corresponds to the second node in the disclosure.

In one embodiment, a node N03 corresponds to one NTN satellite.

In one embodiment, the first measurement result includes an elevation angle.

In one embodiment, the curve S is a horizon line.

In one embodiment, an observed elevation angle of the node N03 is a at P1 point, and an observed elevation angle of the N03 is b at P2 point.

In one embodiment, the b is greater than the a.

In one embodiment, in an area covered by one same satellite, different elevation angles are measured at different locations, the elevation angle information may be used to estimate the position of the obversion point, and the range of the elevation angle may be used to correspond to one geographical region.

In one embodiment, the first identifier set includes an angle between a maximum elevation angle and a minimum elevation angle; the target identifier includes the measured elevation angle in the first measurement result; and when the first identifier set includes the target identifier, the second information is determined to be valid.

Embodiment 9

Figure 9:
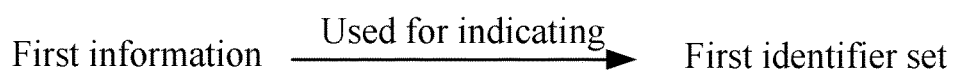
FIG. 9 is a diagram illustrating a scenario in which first information is used for indicating a first identifier set according to one embodiment of the disclosure.

Embodiment 9 illustrates a diagram of a scenario in which first information is used for indicating a first identifier set according to one embodiment of the disclosure, as shown in FIG. 9.

In one embodiment, the first information indicates explicitly the first identifier set.

In one embodiment, the first information includes an SIB1, and the first identifier set includes an identifier indicated by the SIB 1.

In one embodiment, the first information includes a PLMN-IdentityInfoList indicated by an SIB1, and the first identifier set includes a PLMN indicated by the PLMN-IdentityInfoList.

In one embodiment, the first information includes a PLMN-IdentityInfoList indicated by an SIB1, and the first identifier set includes an MCC of a PLMN indicated by the PLMN-IdentityInfoList.

In one embodiment, the first information includes a PLMN-IdentityInfoList indicated by an SIB1, and the first identifier set includes a trackingAreaCode indicated by the PLMN-IdentityInfoList.

In one embodiment, the first information includes a PLMN-IdentityInfoList indicated by an SIB1, and the first identifier set includes an ranac indicated by the PLMN-IdentityInfoList.

In one embodiment, the first information includes a PLMN-IdentityInfoList indicated by an SIB1, and the first identifier set includes a cellIdentity indicated by the PLMN-IdentityInfoList.

In one embodiment, the first information includes an IntraFreqNeighCellList indicated by an SIB1, and the first identifier set includes a physCellId indicated by the IntraFreqNeighCellList.

In one embodiment, the first information includes an InterFreqNeighCellList indicated by an SIB1, and the first identifier set includes a physCellId indicated by the InterFreqNeighCellList.

In one embodiment, the first information includes an ssb-PositionsInBurst indicated by an SIB1, and the first identifier set includes an SSB indicated by the ssb-PositionsInBurst.

In one embodiment, the first information includes an ssb-PositionsInBurst indicated by an SIB1, and the first identifier set includes an index of an SSB indicated by the ssb-PositionsInBurst.

In one embodiment, the first information includes a DCI, and the first identifier set includes an identifier indicated by a short message included in the DCI included in the first information.

In one embodiment, the first information includes a DCI, and the first identifier set includes an index indicated by the DCI included in the first information corresponding to a pdsch-TimeDomainAllocationList.

In one embodiment, the first information includes an RRC message used for carrying an NAS identifier, and the first identifier set includes the NAS identifier carried by the RRC included in the first information.

In one embodiment, the first information includes first area configuration information, and the first identifier set includes an identifier of an area determined by the first area configuration information.

In one embodiment, the first information includes a time range, and the first identifier set includes a time value within the time range included in the first information.

In one embodiment, the first information includes a measurement configuration, and the first identifier set includes a measurement result set determined by the measurement configuration included in the first information.

In one embodiment, the first information includes a measurement configuration, and the first identifier set includes a set of identifiers corresponding to a measurement result set determined by the measurement configuration included in the first information.

In one embodiment, the first information includes time-frequency resource information used for carrying the second information, and the first identifier set includes a set of identifies corresponding to the time-frequency resource information included in the first information used for carrying the second information.

Embodiment 10

Figure 10:
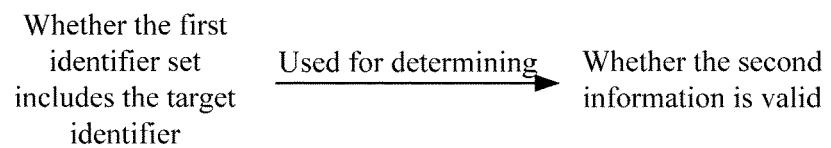
FIG. 10 is a diagram illustrating a scenario in which whether a first identifier set includes a target identifier is used for determining whether second information is valid according to one embodiment of the disclosure.

Embodiment 10 illustrates a diagram of a scenario in which whether a first identifier set includes a target identifier is used for determining whether second information is valid according to one embodiment of the disclosure, as shown in FIG. 10.

In one embodiment, when the first identifier set includes the target identifier, the second information is determined to be valid.

In one embodiment, when the first identifier set does not include the target identifier, the second information is determined to be invalid.

In one embodiment, when the first identifier set only includes an identifier other than the target identifier, the second information is determined to be invalid.

In one embodiment, when a numerical range included in the first identifier set includes a numerical value indicated by the target identifier, the second information is determined to be valid.

In one embodiment, when a numerical range included in the first identifier set does not include a numerical value indicated by the target identifier, the second information is determined to be valid.

In one embodiment, when a numerical value indicated by the target identifier is beyond a numerical range included in the first identifier set, the second information is determined to be valid.

Embodiment 11

Figure 11:
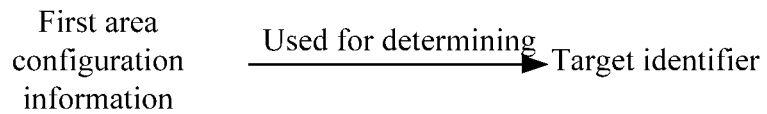
FIG. 11 is a diagram illustrating a scenario in which first area configuration information is used for indicating a target identifier according to one embodiment of the disclosure.

Embodiment 11 illustrates a diagram of a scenario in which first area configuration information is used for determining a target identifier according to one embodiment of the disclosure, as shown in FIG. 11.

In one embodiment, the first area configuration information includes geometrical information of an area.

In one embodiment, the first area configuration information includes a reference origin of an area.

In one embodiment, the first area configuration information includes a number of areas.

In one embodiment, the first area configuration information includes information about a geographical region in which the area is deployed.

In one embodiment, the first area configuration information includes a coordinate about a geographical region in which the area is deployed.

In one embodiment, the first area configuration information includes information about a first geographical region and a method through which the area is deployed in the first geographical region.

In one embodiment, the first area configuration information is used for determining a home area of the first node, and an identifier of the home area is determined as the target identifier.

In one embodiment, the geometrical information includes a length and a width; modulus values obtained from the distances of the first node in x-axis direction and y-axis direction relative to the reference origin modulo the length and the width are used for determining a home area of the first node, and an identifier of the home area is the target identifier.

In one embodiment, the geometrical information includes a radius, the area is a circular area, the position of the reference origin and the radius of the area may be used for determining a home area of the first node, and an identifier of the home area is the target identifier.

In one embodiment, the geometrical information includes a coordinate, the coordinate of the area is used for determining a position of the area, a position of the first node obtained through location and the position of the area are used for determining a home area of the first node, and an identifier of the home area is the target identifier.

In one embodiment, the geometrical information includes vertex information; the vertex information is used for determining a shape and a position of the area; the shape and position, the information about the reference origin, and the position of the first node are used for determining a home area of the first node, and an identifier of the home area is the target identifier.

In one embodiment, the geometrical information includes a shape of an area; the shape includes circle, rectangle, triangle and polygon; information about the first geographic region, the method through which the area is deployed in the first geographical region, the shape of the area and the position of the first node are used for determining a home area of the first node, and an identifier of the home area is the target identifier.

In one embodiment, the geometrical information includes a dimension of an area; a modulus value obtained from the dimension of the first geographical region modulo the dimension of the area, and the position of the first node are used for determining a home area of the first node, and an identifier of the home area is the target identifier.

Embodiment 12

Figure 12:
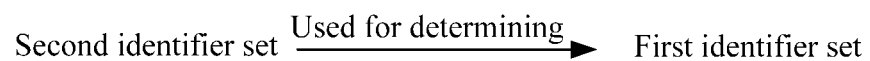
FIG. 12 is a diagram illustrating a scenario in which a second identifier set is used for determining a first identifier set according to one embodiment of the disclosure.

Embodiment 12 illustrates a diagram of a scenario in which a second identifier set is used for determining a first identifier set according to one embodiment of the disclosure, as shown in FIG. 12.

In one embodiment, the first identifier set is a subset of the second identifier set.

In one embodiment, a first sequence includes a sequence of ASN.1 coding of the identifiers in the second identifier set.

In one embodiment, a second sequence includes a sequence of transmission of the identifiers in the second identifier set.

In one embodiment, a third sequence includes a sequence in an RRC message for the identifiers in the second identifier set.

In one embodiment, the first identifier set includes the former I1 identifier(s) in the second identifier set that is(are) determined according to the first sequence, wherein the I1 is a positive integer.

In one embodiment, the first identifier set includes the former I2 identifier(s) in the second identifier set that is(are) determined according to the second sequence, wherein the I2 is a positive integer.

In one embodiment, the first identifier set includes the former I3 identifier(s) in the second identifier set that is(are) determined according to the third sequence, wherein the I3 is a positive integer.

In one embodiment, the first identifier set includes the former I4 identifier(s) in the second identifier set that is(are) determined according to the first sequence, wherein the I4 is a positive integer.

In one embodiment, the first identifier set includes the former I5 identifier(s) in the second identifier set that is(are) determined according to the second sequence, wherein the I5 is a positive integer.

In one embodiment, the first identifier set includes the former I6 identifier(s) in the second identifier set that is(are) determined according to the third sequence, wherein the I6 is a positive integer.

In one embodiment, the first identifier set includes an index in the second identifier set for an identifier included in the second identifier set.

In one embodiment, the second identifier set includes a PLMN in a PLMN-IdentityInfoList, and the first identifier set includes a PLMN in the PLMN-IdentityInfoList included in the second identifier set.

In one embodiment, the second identifier set includes a PLMN in a PLMN-IdentityInfoList, and the first identifier set includes an MCC determined by a PLMN in the PLMN-IdentityInfoList included in the second identifier set.

In one embodiment, the second identifier set includes a physCellId in an IntraFreqNeighCellList, and the first identifier set includes an index of a physCellId in the IntraFreqNeighCellList included in the second identifier set.

In one embodiment, the second identifier set includes a physCellId in a CellAccessRelatedInfo, and the first identifier set includes the former I7 physCellId(s) in the CellAccessRelatedInfo included in the second identifier set that is(are) determined according to the third sequence, wherein the I7 is a positive integer.

In one embodiment, the second identifier set includes a PLMN in a PLMN-IdentityInfoList, and the first identifier set includes an index of a PLMN corresponding to an MCC, determined by a PLMN in the PLMN-IdentityInfoList included in the second identifier set, in the PLMN-IdentityInfoList included in the second identifier set.

In one embodiment, the second identifier set includes a PLMN in a uac-BarringInfo, and the first identifier set includes a PLMN in the uac-BarringInfo included in the second identifier set for which a corresponding uac-BarringFactor has a value of p1, wherein p1 is one of allowed values for the uac-BarringFactor.

In one embodiment, the second identifier set includes a PLMN in a uac-BarringInfo, and the first identifier set includes an index in the uac-BarringInfo for a PLMN for which a corresponding uac-BarringFactor has a value of p2, wherein p2 is one of allowed values for the uac-BarringFactor.

In one embodiment, the second identifier set includes an access type in a uac-BarringInfo, and the first identifier set includes an access type in the uac-BarringInfo included in the second identifier set for which a corresponding uac- BarringFactor has a value of p3, wherein p3 is one of allowed values for the uac-BarringFactor.

In one embodiment, the second identifier set includes an access type in a uac-BarringInfo, and the first identifier set includes an index in the uac-BarringInfo for an access type for which a corresponding uac-BarringFactor has a value of p4, wherein p4 is one of allowed values for the uac-BarringFactor.

Embodiment 13

Figure 13:
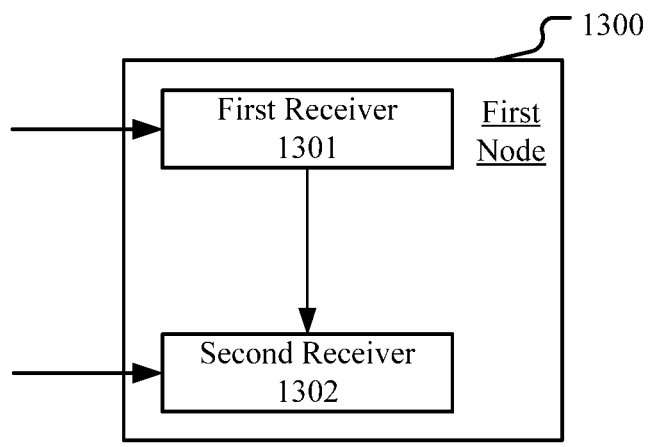
FIG. 13 is a structure block diagram illustrating a processing device in a first node according to one embodiment of the disclosure.

Embodiment 13 illustrates a structure block diagram of a processing device in a first node according to one embodiment of the disclosure, as shown in FIG. 13. In FIG. 13, the processing device 1300 in the first node includes a first receiver 1301 and a second receiver 1302. In Embodiment 13, the first receiver 1301 determines a target identifier; and
the second receiver 1302 receives a first signal, the first signal carrying first information.

Herein, the first information includes information of an access stratum, the first information is used for indicating a first identifier set, and the first identifier set includes a positive integer number of identifiers; the first identifier set is associated to second information; a second signal carries the second information, and the second information includes information of a non-access stratum; whether the first identifier set includes the target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, when the second information is determined to be valid, the second receiver 1302 receives the second signal, the non-access stratum information carried by the second information is forwarded to the non-access stratum, and the first node 1300 indicates to a user a content of a warning message included in the non-access stratum information carried by the second information;

when the second information is determined to be invalid, the first node 1300 neglects the second information.

In one embodiment, when the second information is determined to be valid, the second receiver 1302 receives the second signal, the non-access stratum information carried by the second information is forwarded to the non-access stratum, and the first node 1300 indicates to a user a content of a warning message included in the non-access stratum information carried by the second information;

when the second information is determined to be invalid, the second receiver 1302 receives the second signal, the non-access stratum information carried by the second information is forwarded to the non-access stratum, and the first node 1300 does not indicate to a user a content of a warning message included in the non-access stratum information carried by the second information.

In one embodiment, when the second information is determined to be valid, the second receiver 1302 receives the second signal, the non-access stratum information carried by the second information is forwarded to the non-access stratum, and the first node 1300 indicates to a user a content of a warning message included in the non-access stratum information carried by the second information;

when the second information is determined to be invalid, the second receiver 1302 receives the second signal, the non-access stratum information carried by the second information is forwarded to the non-access stratum, and the first node 1300 does not indicate to a user a content of a warning message included in the non-access stratum information carried by the second information, and the first node 1300 stores the warning message included in the non-access stratum information carried by the second information.

In one embodiment, when the second information is determined to be valid, the second receiver 1302 receives the second signal, the non-access stratum information carried by the second information is forwarded to the non-access stratum, and the first node 1300 indicates to a user a content of a warning message included in the non-access stratum information carried by the second information;

when the second information is determined to be invalid, the second receiver 1302 receives the second signal, the non-access stratum information carried by the second information is forwarded to the non-access stratum, and invalid information of the second information is forwarded to the non-access stratum.

In one embodiment, the first signal and the second signal occupy different time-frequency resources.

In one embodiment, the first signal carries first area configuration information, the first area configuration information includes geometrical information of an area, and the first area configuration information is used for determining the target identifier.

In one embodiment, the first receiver 1301 receives a target signal, wherein the target signal is used for determining a first measurement result, and the first measurement result is used for determining the target identifier.

In one embodiment, the first identifier set includes a Public Land Mobile Network (PLMN) identifier, and the target identifier includes an identifier in a PLMN identifier group selected by the first node.

In one embodiment, the first identifier set includes a country, and the target identifier includes a country.

In one embodiment, the first identifier set includes an identifier used for determining a first time-frequency resource set, and the second signal occupies the first time-frequency resource set; the target identifier includes an identifier used for determining a second time-frequency resource set, and the second time-frequency resource set is used for receiving the second signal.

In one embodiment, the first identifier set includes a tracking area code, and the target identifier includes a tracking area code registered by the first node 1300.

In one embodiment, the first identifier set includes a tracking area identity and the target identifier includes a tracking area identity registered by the first node 1300.

In one embodiment, the first identifier set includes network slice assistance information, and the target identifier includes network slice assistance information allowed for the first node.

In one embodiment, the second receiver 1302 receives a second identifier set, the first identifier set is a subset of the second identifier set, the second identifier set may be used for associating to information other than the second information, and the second identifier set is used for determining the first identifier set.

In one embodiment, the first identifier set is related to a transmission sequence of an identifier in the second identifier set.

In one embodiment, the first information includes system information, and a triggering of a system information change notification is unrelated to whether the first identifier set changes.

In one embodiment, the first node is one UE.

In one embodiment, the first node is one terminal supporting large latency.

In one embodiment, the first node is one terminal supporting NTN.

In one embodiment, the first node is one air vehicle.

In one embodiment, the first node is one vehicle terminal.

In one embodiment, the first node is one relay.

In one embodiment, the first node is one ship.

In one embodiment, the first node is one IoT terminal.

In one embodiment, the first node is one industrial IoT terminal.

In one embodiment, the first node is one equipment supporting low latency and highly reliable transmission.

In one embodiment, the first receiver 1301 includes at least one of the antenna 452, the receiver 454, the receiving processor 456, the multiantenna receiving processor 458, the controller/processor 459, the memory 460 or the data source 467 illustrated in Embodiment 4.

In one embodiment, the second receiver 1302 includes at least one of the antenna 452, the receiver 454, the receiving processor 456, the multiantenna receiving processor 458, the controller/processor 459, the memory 460 or the data source 467 illustrated in Embodiment 4.

Embodiment 14

Figure 14:
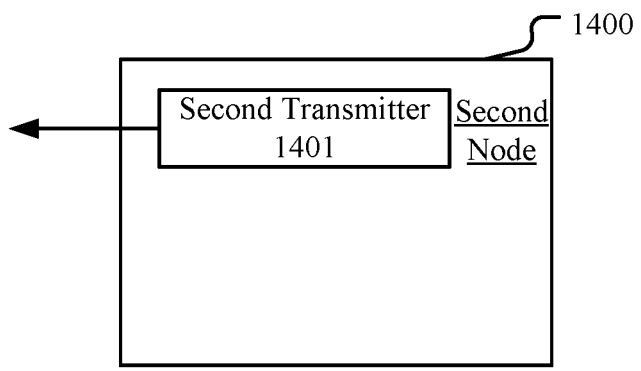
FIG. 14 is a structure block diagram illustrating a processing device in a second node according to one embodiment of the disclosure.

Embodiment 14 illustrates a structure block diagram of a processing device in a second node according to one embodiment of the disclosure, as shown in FIG. 14. In FIG. 14, the processing device 1400 in the second node includes a second transmitter 1401. In Embodiment 14, the second transmitter 1401 transmits a first signal and a second signal, the first signal carrying first information, and the second signal carrying second information.

In Embodiment 14, the first information includes information of an access stratum, the first information is used for indicating a first identifier set, and the first identifier set includes a positive integer number of identifiers; the first identifier set is associated to the second information; the second information includes information of an non-access stratum; whether the first identifier set includes a target identifier is used for determining whether the second information is valid; any one identifier included in the first identifier set may be used for mobility management, information carried by the first signal may be received by more than one node, information carried by the second signal may be received by more than one node, and the first identifier set is related to the access stratum.

In one embodiment, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal neglects the second information.

In one embodiment, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal receives the second signal, the non-access stratum information carried by the second information is forwarded to the non-access stratum, and the receiver of the first signal does not indicate to a user a content of a warning message included in the non-access stratum information carried by the second information.

In one embodiment, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal receives the second signal, the non-access stratum information carried by the second information is forwarded to the non-access stratum, the receiver of the first signal does not indicate to a user a content of a warning message included in the non-access stratum information carried by the second information, and the receiver of the first signal stores the warning message included in the non-access stratum information carried by the second information.

In one embodiment, when the second information is determined by a receiver of the first signal to be valid, the receiver of the first signal receives the second signal, the non-access stratum information carried by the second information is forwarded to the non-access stratum, and the receiver of the first signal indicates to a user a content of a warning message included in the non-access stratum information carried by the second information;

when the second information is determined by a receiver of the first signal to be invalid, the receiver of the first signal receives the second signal, the non-access stratum information carried by the second information is forwarded to the non-access stratum, and invalid information of the second information is forwarded to the non-access stratum.

In one embodiment, the first signal and the second signal occupy different time-frequency resources.

In one embodiment, the first signal carries first area configuration information, the first area configuration information includes geometrical information of an area, and the first area configuration information is used for determining the target identifier.

In one embodiment, the second transmitter 1401 transmits a target signal, wherein the target signal is used for determining a first measurement result, and the first measurement result is used for determining the target identifier.

In one embodiment, the first identifier set includes a PLMN identifier, and the target identifier includes an identifier in a PLMN identifier group selected by the receiver of the first signal.

In one embodiment, the first identifier set includes a county, and the target identifier includes a country.

In one embodiment, the first identifier set includes an identifier used for determining a first time-frequency resource set, and the second signal occupies the first time-frequency resource set; the target identifier includes an identifier used for determining a second time-frequency resource set, and the second time-frequency resource set is used for receiving the second signal.

In one embodiment, the first identifier set includes a tracking area code, and the target identifier includes a tracking area code registered by the receiver of the first signal.

In one embodiment, the first identifier set includes a tracking area identity, and the target identifier includes a tracking area identity registered by the receiver of the first signal.

In one embodiment, the first identifier set includes network slice assistance information, and the target identifier includes network slice assistance information allowed for the receiver of the first signal.

In one embodiment, the second transmitter 1401 transmits a second identifier set, the first identifier set is a subset of the second identifier set, the second identifier set may be used for associating to information other than the second information, and the second identifier set is used for determining the first identifier set.

In one embodiment, the first identifier set is related to a transmission sequence of an identifier in the second identifier set.

In one embodiment, the first information includes system information, and a triggering of a system information change notification is unrelated to whether the first identifier set changes.

In one embodiment, the second node is a base station.

In one embodiment, the second node is a satellite.

In one embodiment, the second node is a UE.

In one embodiment, the second node is a gateway.

In one embodiment, the second node is a base station supporting large latency.

In one embodiment, the second transmitter 1401 includes at least one of the antenna 420, the transmitter 418, the transmitting processor 416, the multiantenna transmitting processor 471, the controller/processor 475 or the memory 476.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, air vehicles, diminutive airplanes, mobile phones, tablet computers, laptops, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, NTN UEs and other radio communication equipment. The base station or system equipment in the disclosure includes but not limited to macro-cellular base stations, micro-cellular base stations, home base stations, relay base station, gNBs (NR nodes B), Transmitter Receiver Points (TRPs), NTN base stations, satellite equipment, flight platform equipment and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first node for wireless communication, comprising:
a first receiver, to determine a target identifier; and
a second receiver, to receive a first signal, the first signal carrying first information;
wherein the first information comprises information of an access stratum, the first information is used for indicating a first identifier set, and the first identifier set comprises a positive integer number of identifiers; the first identifier set is associated to second information; a second signal carries the second information, and the second information comprises information of a non-access stratum; whether the first identifier set comprises the target identifier is used for determining whether the second information is valid; any one identifier comprised in the first identifier set may be used for mobility management, information carried by the first signal may be received by more than one node, information carried by the second signal may be received by more than one node, and the first identifier set is related to the access stratum; the first identifier set comprises a Mobile Country Code; the first identifier set comprises a Public Land Mobile Network (PLMN) identifier, and the target identifier comprises an identifier in a PLMN identifier group selected by the first node; the first information includes a time range, and the first identifier set includes a time value within the time range included in the first information.

2. The first node according to claim 1, comprising:
the first receiver, to receive a target signal, wherein the target signal is used for determining a first measurement result, and the first measurement result is used for determining the target identifier.

3. The first node according to claim 2, comprising:
the first measurement result includes an elevation angle; the first identifier set includes an angle between a maximum elevation angle and a minimum elevation angle; the target identifier includes the measured elevation angle in the first measurement result; and when the first identifier set includes the target identifier, the second information is determined to be valid.

4. The first node according to claim 2, comprising:
the first measurement result includes an eccentricity of the second node; the eccentricity included in the measurement result is used for determining a shape of an orbit; in combination with the current time, the first measurement result is used for determining distances from a perigee and an apogee to a geocentre and a distance difference; the distances and the distance difference are used for calculating a size of a coverage of the second node on the earth surface; the size of the coverage is used for estimating whether the serving cell of the first node can cover a valid area of the second information.

5. The first node according to claim 2, comprising:
the first signal is transmitted on an NTN related channel; the second signal is transmitted on an NTN related channel; the target signal includes a TN cell signal.

6. The first node according to claim 1, comprising:
the target identifier includes a relative position of the first node to a point A.

7. The first node according to claim 1, comprising:
the first identifier set comprises a search space which is used for detecting a PDCCH indicating the second signal.

8. The first node according to claim 7, comprising:
when the second information is determined to be invalid, the first node does not detect a PDCCH scrambled with an SI-RNTI in a search space of the PDCCH indicating the second signal.

9. The first node according to claim 1, comprising:
when the second information is determined to be invalid, the first node does not detect a PDCCH scrambled with a P-RNTI in a search space of the PDCCH indicating the second signal.

10. The first node according to claim 1, comprising:
the second receiver receives a second identifier set, the first identifier set is a subset of the second identifier set, the second identifier set may be used for associating to information other than the second information, and the second identifier set is used for determining the first identifier set; the first identifier set is related to a transmission sequence of an identifier in the second identifier set.

11. The first node according to claim 10, comprising:
the transmission sequence of the identifier in the second identifier set includes a sequence from MSB to LSB formed by a bit string in a packaged PDU corresponding to the identifier in the second identifier set.

12. The first node according to claim 10, wherein
the first identifier set comprises an SSB index; the second identifier set includes an SSB indicated by an ssb-PositionsInBurst transmitted in an SIB 1.

13. The first node according to claim 1, wherein
the first identifier set comprises a tracking area code, and the target identifier comprises a track area code registered by the first node.

14. The first node according to claim 1, wherein
an RRC message carried by the second signal is not encrypted and has no integrity protection.

15. The first node according to claim 14, wherein
at least one Resource Element (RE) in the time-frequency resources carrying the first signal does not belong to the time-frequency resources carrying the second signal.

16. A second node for wireless communication, comprising:
a second transmitter, to transmit a first signal and a second signal, the first signal carrying first information, and the second signal carrying second information;
wherein the first information comprises information of an access stratum, the first information is used for indicating a first identifier set, and the first identifier set comprises a positive integer number of identifiers; the first identifier set is associated to the second information; the second information comprises information of an non-access stratum; whether the first identifier set comprises a target identifier is used for determining whether the second information is valid; any one identifier comprised in the first identifier set may be used for mobility management, information carried by the first signal may be received by more than one node, information carried by the second signal may be received by more than one node, and the first identifier set is related to the access stratum; the first identifier set comprises a Mobile Country Code; the first identifier set comprises a Public Land Mobile Network (PLMN) identifier, and the target identifier comprises an identifier in a PLMN identifier group selected by the first node; the first information includes a time range, and the first identifier set includes a time value within the time range included in the first information.

17. The second node according to claim 16, wherein
the second node is at different spatial positions at different time, and covers different areas.

18. The second node according to claim 17, wherein
the second node includes an NTN satellite, and the target signal includes an ephemeris of the second node.

19. A method in a first node for wireless communication, comprising:
determining a target identifier; and
receiving a first signal, the first signal carrying first information;
wherein the first information comprises information of an access stratum, the first information is used for indicating a first identifier set, and the first identifier set comprises a positive integer number of identifiers; the first identifier set is associated to second information; a second signal carries the second information, and the second information comprises information of a non-access stratum; whether the first identifier set comprises the target identifier is used for determining whether the second information is valid; any one identifier comprised in the first identifier set may be used for mobility management, information carried by the first signal may be received by more than one node, information carried by the second signal may be received by more than one node, and the first identifier set is related to the access stratum; the first identifier set comprises a Mobile Country Code; the first identifier set comprises a Public Land Mobile Network (PLMN) identifier, and the target identifier comprises an identifier in a PLMN identifier group selected by the first node; the first information includes a time range, and the first identifier set includes a time value within the time range included in the first information.

20. A method in a second node for wireless communication, comprising:
transmitting a first signal and a second signal, the first signal carrying first information, and the second signal carrying second information;
wherein the first information comprises information of an access stratum, the first information is used for indicating a first identifier set, and the first identifier set comprises a positive integer number of identifiers; the first identifier set is associated to the second information; the second information comprises information of an non-access stratum; whether the first identifier set comprises a target identifier is used for determining whether the second information is valid; any one identifier comprised in the first identifier set may be used for mobility management, information carried by the first signal may be received by more than one node, information carried by the second signal may be received by more than one node, and the first identifier set is related to the access stratum; the first identifier set comprises a Mobile Country Code; the first identifier set comprises a Public Land Mobile Network (PLMN) identifier, and the target identifier comprises an identifier in a PLMN identifier group selected by the first node; the first information includes a time range, and the first identifier set includes a time value within the time range included in the first information.

* * * * *